(12) United States Patent
Bjelland et al.

(10) Patent No.: US 11,200,245 B2
(45) Date of Patent: Dec. 14, 2021

(54) FUZZY SEARCHING AND APPLICATIONS THEREFOR

(71) Applicant: Palantir Technologies Inc., Palo Alto, CA (US)

(72) Inventors: Petter Christian Sogn Bjelland, Oslo (NO); Declan Clowry, London (GB)

(73) Assignee: Palantir Technologies Inc., Denver, CO (US)

( * ) Notice: Subject to any disclaimer, the term of this patent is extended or adjusted under 35 U.S.C. 154(b) by 249 days.

(21) Appl. No.: 16/421,585

(22) Filed: May 24, 2019

(65) Prior Publication Data

US 2020/0278964 A1    Sep. 3, 2020

(30) Foreign Application Priority Data

Mar. 1, 2019  (GB) .................................... 1902772

(51) Int. Cl.
*G06F 16/2458* (2019.01)
*G06F 16/22* (2019.01)

(52) U.S. Cl.
CPC ...... *G06F 16/2468* (2019.01); *G06F 16/2246* (2019.01); *G06F 16/2462* (2019.01)

(58) Field of Classification Search
CPC ... G06F 16/2246; G06F 16/2458–2468; G06F 16/90344; G06F 2207/025
See application file for complete search history.

(56) References Cited

U.S. PATENT DOCUMENTS

| | | | |
|---|---|---|---|
| 2012/0215806 A1* | 8/2012 | Pryakhin | G06F 16/322 707/769 |
| 2014/0201247 A1* | 7/2014 | Kirazci | G06F 16/9027 707/803 |

(Continued)

FOREIGN PATENT DOCUMENTS

WO    2006/130947 A1    12/2006

OTHER PUBLICATIONS

Rheinlander, Astrid et al.; Prefix Tree Indexing for Similarity Search and Similarity Joins on Genomic Data Scientific and Statistical Database Management; Jun. 30, 2010.

(Continued)

*Primary Examiner* — Robert W Beausoliel, Jr.
*Assistant Examiner* — Nirav K Khakhar
(74) *Attorney, Agent, or Firm* — Faegre Drinker Biddle & Reath LLP

(57) ABSTRACT

A method, system and computer program product is disclosed for fuzzy searching. The method, which may be performed by one or more processors, may comprise providing a first prefix tree data structure representing a first data set comprising a first plurality of strings, and providing a second prefix tree data structure representing a second data set comprising a second plurality of strings. The first and second prefix tree data structures may each comprise nodes representing each character and edges connecting prefix nodes to one or more suffix nodes to represent each subsequent character in the string. A search may be performed to identify all matches between the first and second plurality of strings and also approximate matches between the first and second plurality of strings within a maximum distance k, wherein the search comprises traversing the first prefix tree data structure using a depth-first search algorithm to identify (Continued)

matches and approximate matches in the second prefix tree data structure.

14 Claims, 9 Drawing Sheets

(56) References Cited

U.S. PATENT DOCUMENTS

| 2015/0186538 | A1* | 7/2015 | Yan | G06F 16/2246 |
| | | | | 707/722 |
| 2018/0137387 | A1* | 5/2018 | Lee | G06K 9/6892 |
| 2019/0251085 | A1* | 8/2019 | Sun | G06F 16/2468 |
| 2019/0317940 | A1* | 10/2019 | Bauer | G06F 16/2246 |

OTHER PUBLICATIONS

Schallehn, E.; Efficient similarity-based operations for data integration; Data & Knowledge Engineering; vol. 48, No. 3; Mar. 1, 2004.

* cited by examiner

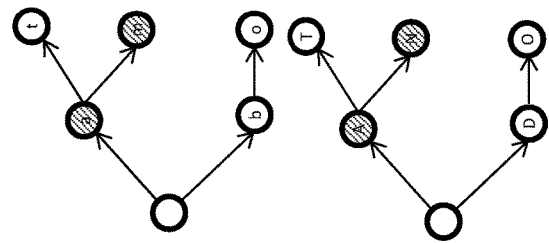
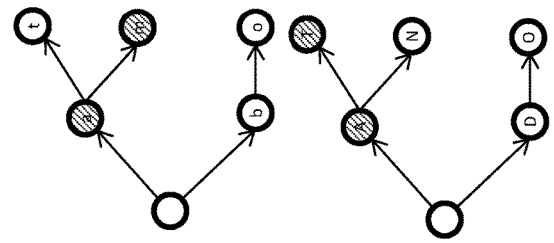
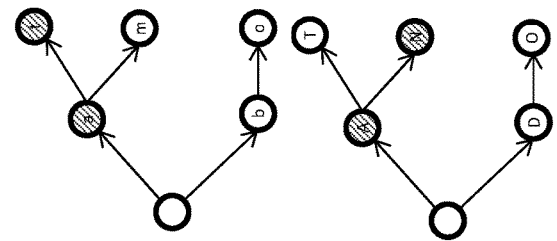
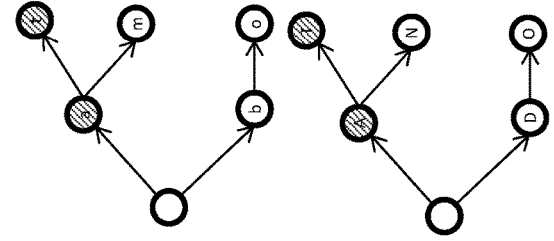
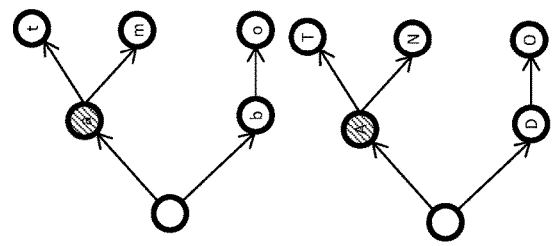
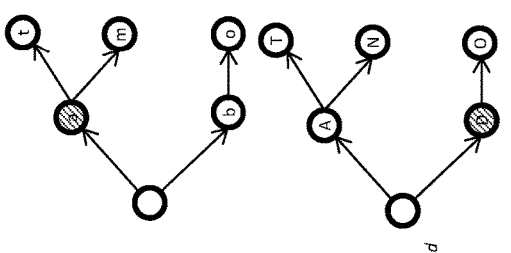
FIG. 8A  FIG. 8B  FIG. 8C  FIG. 8D  FIG. 8E
FIG. 8F  FIG. 8G  FIG. 8H  FIG. 8I  FIG. 8J

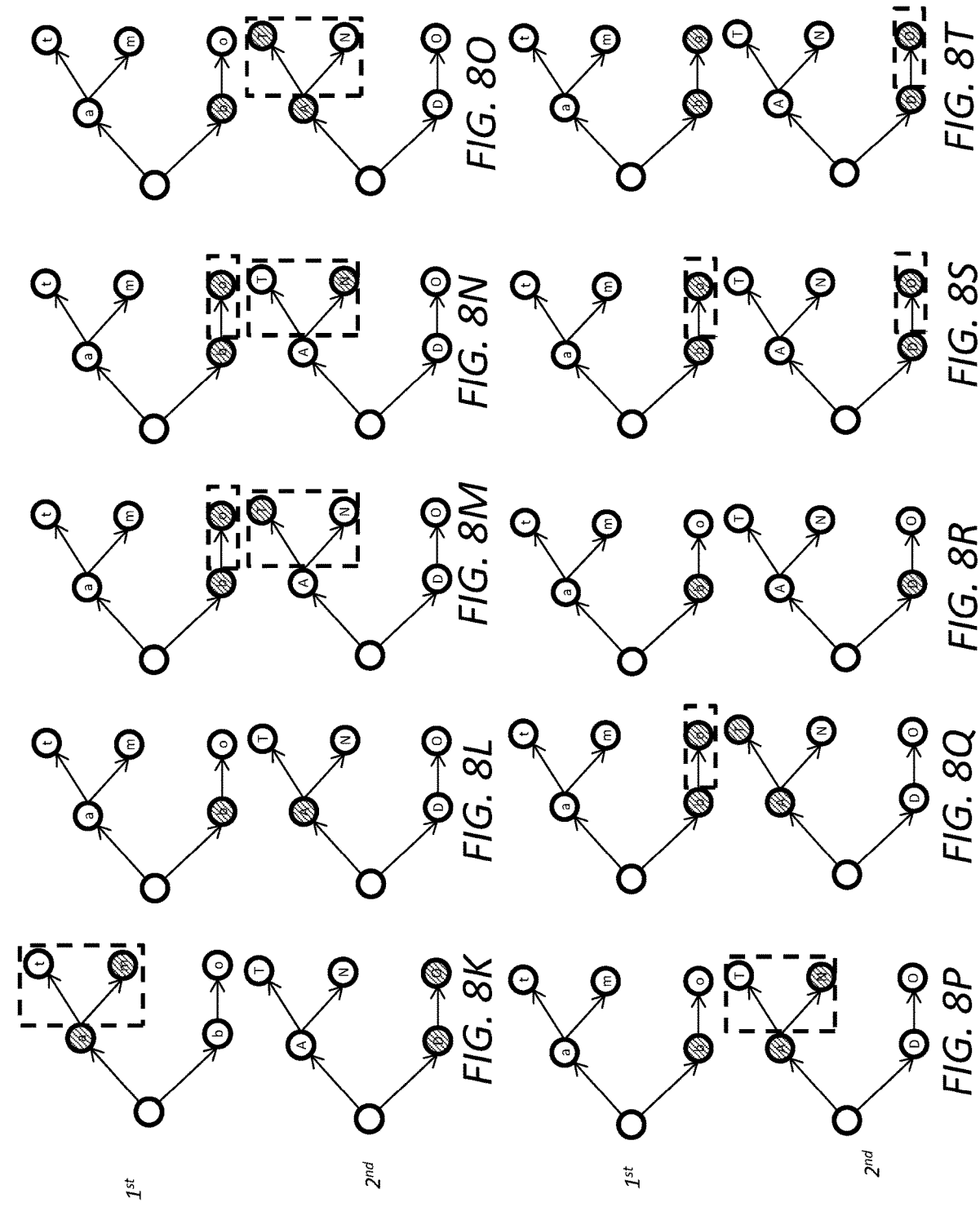

FUZZY SEARCHING AND APPLICATIONS THEREFOR

CROSS REFERENCE TO RELATED APPLICATIONS

This application claims priority to UK Patent Application No. 1902772.1, filed on Mar. 1, 2019, incorporated by reference herein for all purposes.

FIELD OF THE DISCLOSURE

The present disclosure relates to a method and systems for fuzzy searching and also of specific applications of fuzzy searching.

BACKGROUND

Fuzzy searching is the process of finding matches between data items, for example data items that include strings of alphanumeric characters, including not only exact matches but also non-exact matches with a tolerable amount of error. This can be a data intensive task, depending on the size of the data being searched and/or the size of the data it is being searched against.

Two known algorithms include pairwise matching, based on using the Levenshtein distance (LD), and the matching of input against a dictionary of strings, based on using Levenshtein automaton (LA). Pairwise matching tends to be slow, whereas LA tends to be faster.

Such known algorithms have disadvantages in terms of the number of processing operations required to perform all possible comparisons, which translates not only into long processing times (the time can run into days, weeks or longer if the number of data items is massive) but also undesirable electrical energy usage, heat generation and the fact that running such algorithms takes processing and storage resources away from other computer processes.

SUMMARY

According to one example embodiment, there is disclosed a method, performed by one or more processors, the method comprising: providing a first prefix tree data structure representing a first data set comprising a first plurality of strings; providing a second prefix tree data structure representing a second data set comprising a second plurality of strings, wherein the first and second prefix tree data structures each comprise nodes representing each character and edges connecting prefix nodes to one or more suffix nodes to represent each subsequent character in the string; performing a search to identify all matches between the first and second plurality of strings and also approximate matches between the first and second plurality of strings within a maximum distance k, wherein the search comprises traversing the first prefix tree data structure using a depth-first search algorithm to identify matches and approximate matches in the second prefix tree data structure; and returning as output all matches and approximate matches.

In some examples, the method may further comprise traversing the second prefix tree data structure using the depth-first search algorithm to identify all matches and approximate matches in the first prefix tree data structure at the corresponding node depth; and returning as further output all matches and approximate matches.

In certain examples, the depth-first search algorithm may be configured such that each prefix node is evaluated only once prior to traversing to another prefix node at the same level in the same tree structure. The maximum distance k may be any positive integer and wherein, whilst a current distance does not exceed said maximum distance k, the depth-first search algorithm may jump over non-matching nodes to dependent nodes.

In some examples, the depth-first search algorithm may comprise: comparing first and second nodes having the same depth level in the first and second prefix trees to identify a match; in the event of a match, traversing to respective descendent nodes of the first and second nodes in a depth-first order and repeating the comparison until there is no match or there are no further descendent nodes; in the event of no match at the same depth level: incrementing or changing a dynamic distance measure; and, while a current distance measure does not exceed or go beyond the maximum distance k, comparing possible combinations of descendent nodes of the non-matching prefix node of one of the prefix trees with possible combinations of descendent nodes of the other non-matching prefix node of the other prefix tree; and identifying an approximate match if there are no further descendent nodes.

In some examples, in the event of no match at the same depth level, and, while the current distance measure does not exceed the maximum distance k, the method may further comprise: comparing also each non-matching prefix node with possible combinations of descendent nodes of the other non-matching prefix node; and identifying an approximate match if there are no further descendent nodes. The comparing may follow a predetermined depth-first traversal algorithm having a predetermined traversal order for performing the comparisons.

In certain examples, the distance measure may be a Levenshtein distance (LD), being the minimum number of single character changes required to change one string to the other. The predetermined maximum distance k may be user definable through a user interface.

In some examples, the method may further comprise receiving a first plurality of strings and generating therefrom the first prefix tree data structure, and receiving a second plurality of strings and generating therefrom the second prefix tree structure.

In certain examples, the method may further comprise storing the first and second prefix tree data structures in respective data containers for subsequent sending to a plurality of processors or controller for performance of the depth-first search algorithm using parallel processing.

In some examples, the first plurality of strings may comprise a sanctions list of entities not permitted to access, or perform one or more operations at, one or more technical systems, and wherein the second plurality of strings comprises a list of entities requesting access or performance of the operations at the one or more technical systems. The sanctions list may comprise a list of network addresses, e.g. IP address, which are blocked from accessing a computer system, and wherein the second plurality of strings comprises a list of IP addresses requesting access to the computer system.

In certain examples, the first plurality of strings may comprise a reference list of genetic sequences held on a database, or indeed any biological or chemical sequences, and wherein the second plurality of strings comprises a list of genetic or other sequences to be compared with the reference list.

According to some other example embodiments, there is provided a computer program, optionally stored on a non-transitory computer readable medium which, when executed by one or more processors of a data processing apparatus, causes the data processing apparatus to carry out one or more methods set forth herein.

According to some other example embodiments, there is provided an apparatus configured to carry out one or more methods according to one or more methods set forth herein, the apparatus comprising one or more processors or special-purpose computing hardware.

BRIEF DESCRIPTION OF THE DRAWINGS

Example embodiments will now be described by way of non-limiting example with reference to the accompanying drawings, in which:

FIGS. 8A-8U are schematic diagrams of examples of first and second prefix trees, respectively representing first and second dictionaries, for understanding operation of the FIG. 6 and FIG. 7 operations at various stages.

DETAILED DESCRIPTION OF CERTAIN EMBODIMENTS

Reference will now be made in detail to example embodiments for carrying out the subject matter of the present disclosure. In the following description, specific details are set forth in order to provide a thorough understanding of the subject matter. It shall be appreciated that embodiments may be practiced without some or all of these specific details.

Example embodiments relate to computer-implemented methods of fuzzy searching and computer systems for implementing fuzzy searching methods. For example, a search algorithm is proposed which is found to produce the same results as the Levenshtein distance (LD) and Levenshtein automaton (LA) algorithms, but using significantly fewer processing operations for reading and/or writing data in terms of, respectively, fetching characters for comparison with other characters and returning the results of the search, i.e. matches and approximate matches. In one example, the search algorithm is configured to perform fuzzy searching in bulk, comparing two entire data sets, which sets may be termed dictionaries, against one another.

For ease of explanation, embodiments of the algorithm may refer to the search algorithm as multi-pattern approximate search (MPAS).

Some example embodiments enable a user-definable maximum error, referred to a maximum distance, to be set and the algorithm identifies zero, one or more strings in the searched dictionary having a distance that does not exceed the maximum distance, which is termed k.

In some embodiments, the distance refers to the Levenshtein distance (LD), being the minimum number of single character changes required to change one string to the other. Hence, two strings "abba" and "aba" have an LD of 1, whereas "chris" and "kris" have an LD of 2. If the maximum distance, or maximum LD is set at k=1, then the algorithm may return "aba" as a match for "abba" but "kris" will not be returned for "chris". Making the maximum distance user-definable means that different applications, or different degrees of "fuzziness", can be catered for.

In some example embodiments, the algorithm may comprise providing or creating first and second data structures representing each dictionary. Each data structure may take the form of prefix tree (for example, a trie) which is a form of Directed Acyclic Word Graph (DAWG). A prefix tree comprises nodes and edges. A node corresponds to a character and an edge is a connection between the character and a subsequent, or descendent, character node. Therefore, assuming strings of two or more characters, each prefix tree may comprise a root node, and one or more branches (edges) to first level nodes representing each different first character of each string in the data set. Zero, one or more branches (edges) may continue from the first level prefix node to zero, one or more second level nodes to represent the next character of each string in the data set, and so on.

Figure 1:
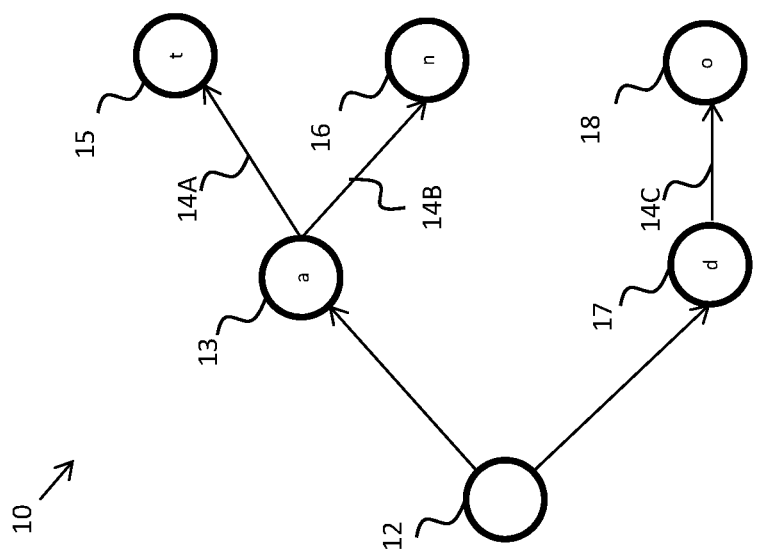
FIG. 1 is a schematic diagram of a prefix tree according to some embodiments.

FIG. 1 is an example of a "trie" prefix tree 10 representing a list of three words {at, an, do} forming a first dictionary. The root node 12 is shown blank. Given that there are two unique first characters, i.e. "a" and "d", there are two first-level nodes 13, 17. Edges 14A-14C connect "a" and "d" to subsequent, second-level nodes 15, 16, 18. Particularly, first and second edges 14A, 14B connect the "a" node 13 respectively to a "t" node 15 and an "n" node. A third edge 14C connects the "d" node 17 to an "o" node 18. The "a" node 13 may be termed a prefix node 13 to its suffix or descendent nodes "t" and "n" and "d" 17 is a prefix node to the descendent node "o".

Example embodiments of the MPAS algorithm handle a depth-first search (DFS) in both graphs. For example, the first level nodes 13, 17 are first compared and, depending on whether there is a match or not, the algorithm dictates whether or not a current distance is updated, for which prefix tree, and how subsequent iterations are performed using different branches depending on the current distance. For example, if the maximum distance is two, then subsequent levels may be compared (skipped over) notwithstanding that there is no match between first characters of a word, e.g. for "horse" and "nurse".

Figure 2:
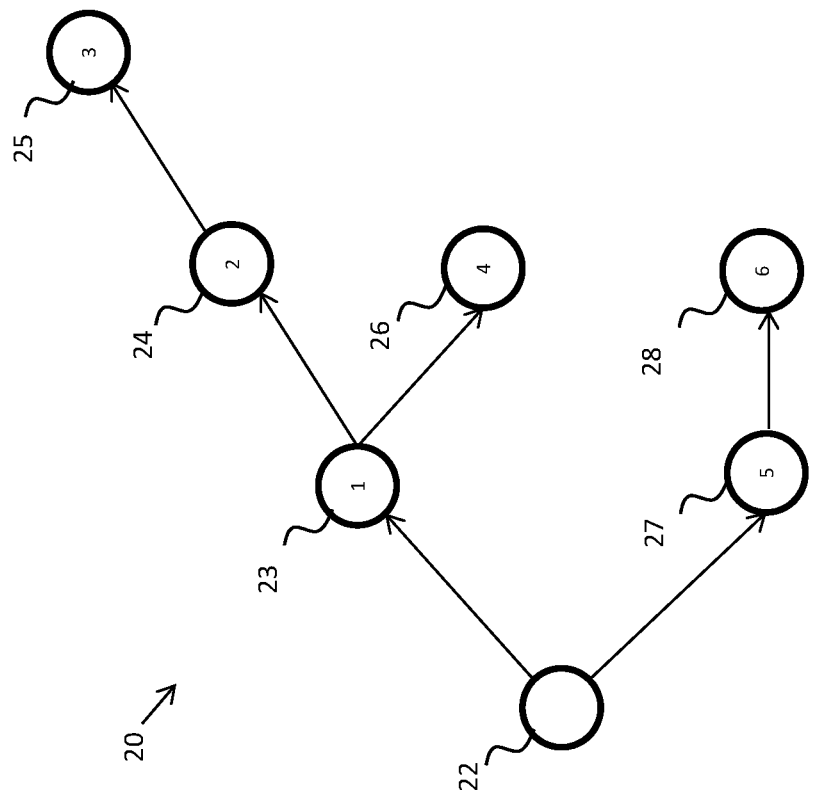
FIG. 2 is a schematic diagram depicting an example of another prefix tree for understanding of depth-first searching or traversal.

FIG. 2 is an example of a further prefix tree 20 for illustrating the general concept of a depth-first search as opposed to, for example, a breadth-first search. The numbers {1-6} shown within the nodes 22-28 of the prefix tree 20 indicate an order of traversal, which generally proceeds depth-wise within a branch until there are no nodes left in that branch, in which case the next available branch or branches (not already traversed) from preceding prefix nodes are then traversed, and so on until all nodes are traversed. The order of output produced is Last In First Out (LIFO), or a stack process, as opposed to First In First Out (FIFO), or a queue process.

When combinations in a given order are considered according to the algorithm, the process may cease and all results returned. Alternatively, results may be returned when a condition is reached, for example when the end of a branch is reached (provided the maximum distance has not been exceeded) and then other branches traversed until all have been traversed. When the maximum distance is exceeded, which may occur part-way along a particular branch, the remainder of the nodes within that branch need not be traversed and a different branch may be traversed and so on until the entire tree is traversed. The results will comprise all matches, including approximate matches within the allowable maximum distance k.

The depth-first algorithm is found to produce the same results as LD and LA algorithms but using fewer operations to retrieve and send data to and from memory, thereby being significantly quicker, using less processing and memory resources and also saving energy.

The algorithm and/or the prefix trees may be containerised in a binary format such that they are transportable, e.g. they can be distributed over a network. This may comprise creating a data structure for holding the algorithm/prefix trees, either together or separately, the data structure having a unique namespace in memory, and which can be referenced as a file or its location referenced by a URI or URL. The containerised prefix trees may, for example, be transmitted to different processing entities configured to perform respective parts of the algorithm to provide even faster results by virtue of parallel processing.

Figure 3:
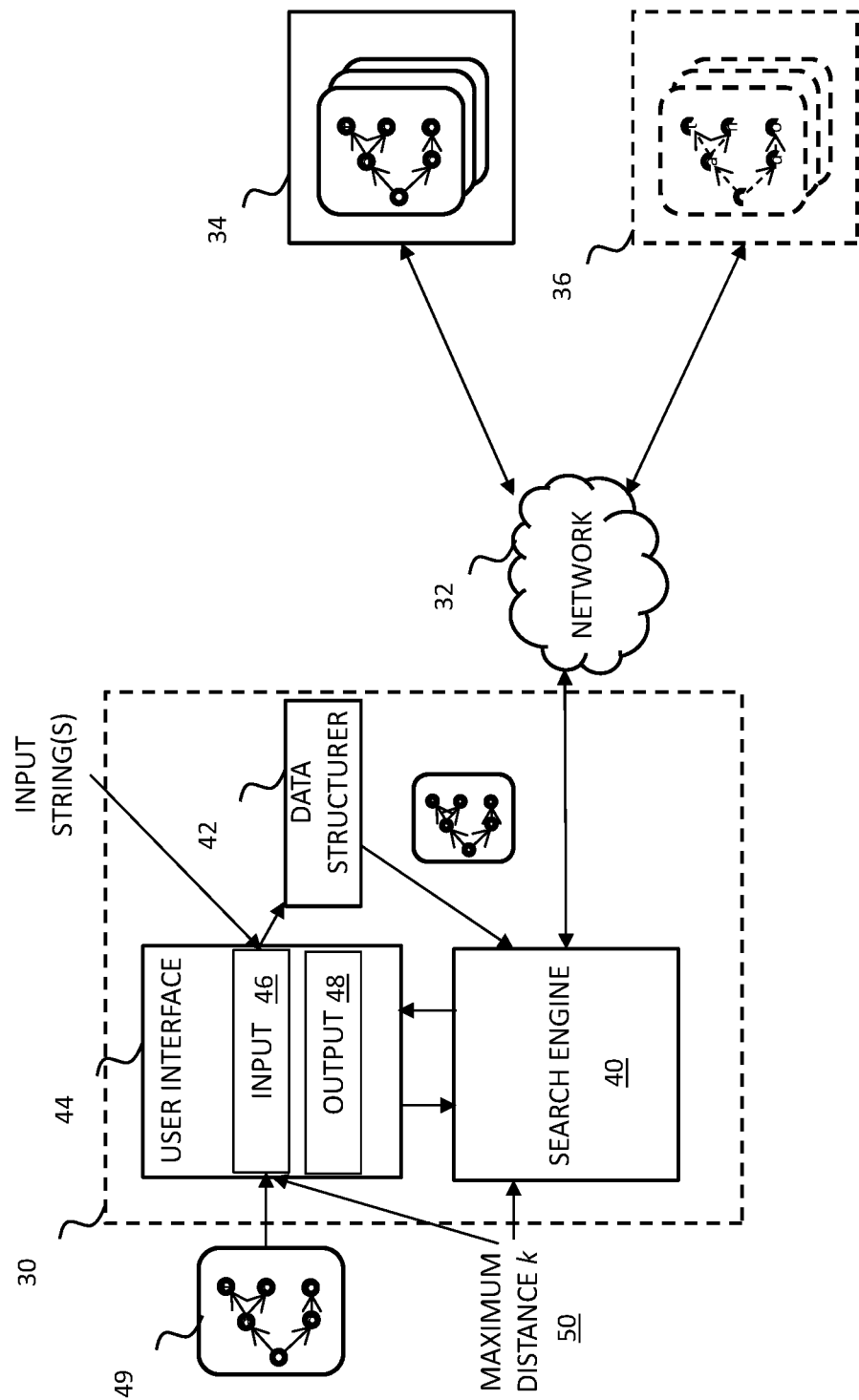
FIG. 3 is a schematic diagram of a search system according to example embodiments, shown as part of a network.

FIG. 3 is a block diagram of a system including a search system 30 according to an example embodiment. The search system 30 may be connected via a network 32 to a first database 34 holding one or more first dictionaries, which are data sets to be searched. Each data set may comprise a plurality of strings, at least some of the strings comprising at least two characters. The characters may represent alphanumeric characters, for example, but embodiments are not so limited. Any discrete data entities, such as glyphs, symbols or graphics may comprise a character, provided they can be compared digitally. The strings may represent any entity, such as people, users of a computer network, a computer address, a computer terminal identifier, a vehicle or craft registration, a genetic or protein sequence, a technical process, or part thereof.

The strings of a given first dictionary in the first database 34 may be pre-provided as a prefix tree data structure. Alternatively, the strings may be received by the search system 30 and converted into a prefix tree data structure using known methods. The generated prefix tree data structure may be sent back to the first database 34 or stored locally at the search system 30.

A second database 36 may also be connected to the network 32. The second database 36 may hold one or more second dictionaries for searching against one or more of the first dictionaries in the first database 34. Similarly, each data set may comprise a plurality of strings, at least some of the strings comprising at least two characters. Similarly also, the strings of a given second dictionary in the second database 34 may be pre-provided as a prefix tree data structure. Alternatively, the strings may be received by the search system 30 and converted into a prefix tree data structure using known methods. The generated prefix tree data structure may be sent back to the second database 36 or stored locally at the search system 30.

Alternatively still, a second dictionary may be entered into the search system 30 by a user, for example as a series of strings entered through a user interface, or uploaded in bulk by specifying a file name or link.

The search system 30 may comprise the functional modules of a search engine 40, a data structurer 42, and a user interface 44. The user interface 44 may comprise an input part 46 and an output part 48. The search engine 40 is configured to perform the MPAS algorithm to be explained further below. The search engine 40 may comprise executable software, hardware or a combination of both. The data structurer 42 is an optional module for receiving input strings and generating a prefix tree therefrom for use within the algorithm implemented by the search engine 40. The input part 46 of the user interface 44 is for receiving selection of one or more first dictionaries to search against, and either selection or input of one or more second dictionaries to compare with the selected one or more first dictionaries. For example, a user may select a particular dictionary stored in the first database 34 which is a prefix tree data structure representing IP addresses not permitted to access a network or part of a network. The user may select this via the input part 46 of the user interface 46. For example, the user may then enter a list of users requiring access to said network or part of the network. The list of users may be entered manually and the data structurer 42 used to create the second prefix tree representing the entered list of users. Alternatively, the user may simply upload a pre-provided prefix tree data structure 49 as the second dictionary. The input part 46 may also be used to user-define the maximum distance k. A default maximum distance k may be provided, e.g. k=1 n where n is a positive integer, which is modifiable through the input part 46. The output part 48 may provide a results list of all possible matches between the first and second dictionaries, including fuzzy matches.

Figure 4:
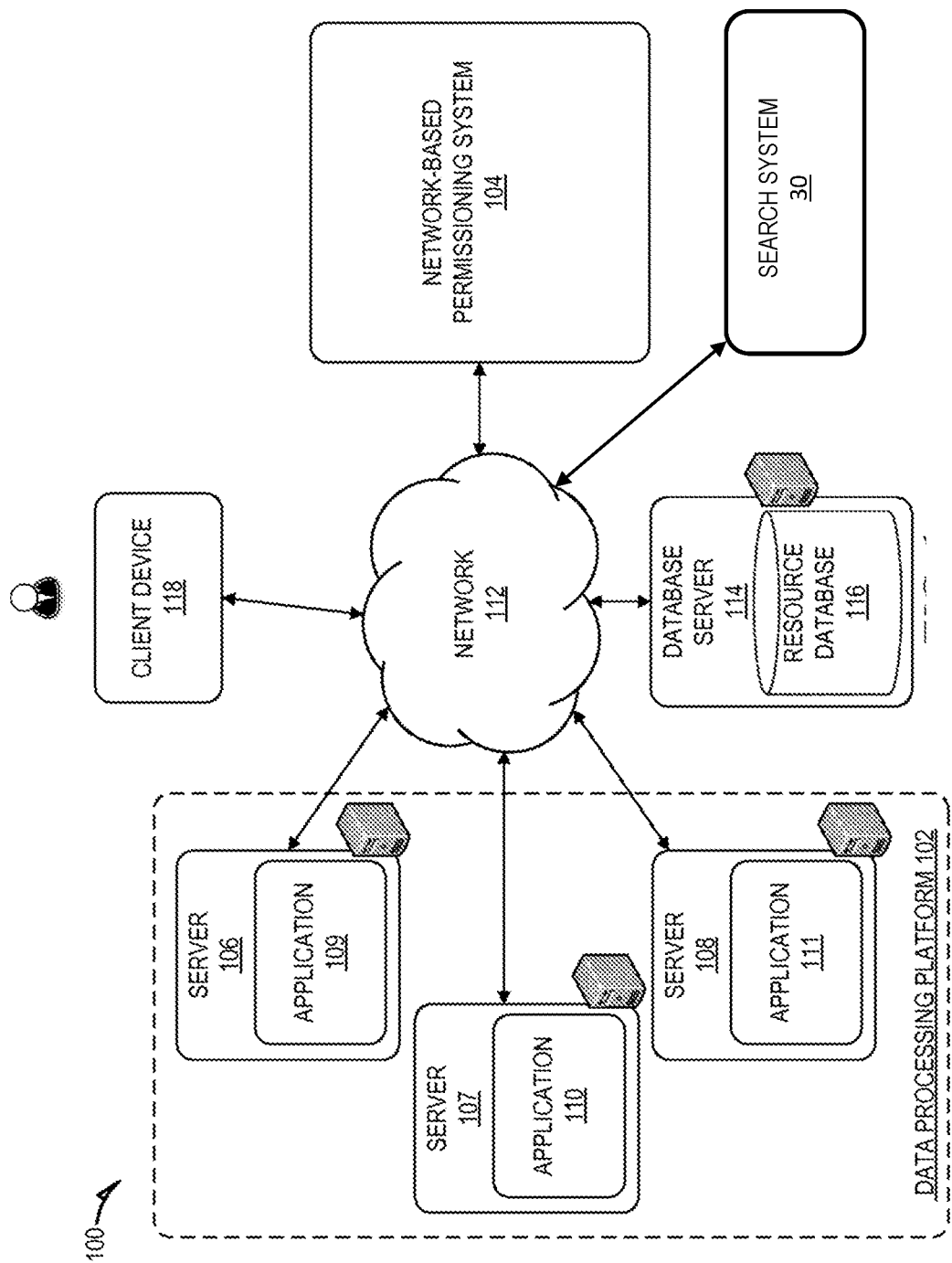
FIG. 4 is a network diagram depicting a network system comprising a data processing platform in communication with a network-based authentication system and including the FIG. 3 search system according to some embodiments.

The search system 30 may be provided as a system or application within an organisation that provides access to a data processing platform 102, as shown in FIG. 4.

FIG. 4 is a network diagram depicting a network system 100 comprising a data processing platform 102 in communication with the search system 30 and also a network-based permissioning system 104 configured for evaluating access permissions for data resources to which the group of application servers 106-108 share common access, according to an example embodiment. Consistent with some embodiments, the network system 100 may employ a client-server architecture, though the network system is not limited to such an architecture, and could equally well find application in an event-driven, distributed, or peer-to-peer architecture system, for example. Moreover, it shall be appreciated that although the various functional components of the network system 100 are discussed in the singular sense, multiple instances of one or more of the various functional components may be employed.

The data processing platform 102 includes a group of servers—specifically, servers 106-108, which host network applications 109-111, respectively. The network applications 109-111 hosted by the data processing platform 102 may collectively compose an application suite that provides users of the network system 100 with a set of related, although independent, functionalities that are accessible by a common interface. For example, the network applications 109-111 may compose a suite of software application tools that can be used to analyse data to develop various insights about the data, and visualize various metrics associated with the data. To further this example, the network application 109 may be used to analyse data to develop particular metrics with respect to information included therein, while the network application 110 may be used to render graphical representations of such metrics. It shall be appreciated that although FIG. 4 illustrates the data processing platform 102 as including a particular number of servers, the subject matter disclosed herein is not limited to any particular number of servers and in other embodiments, fewer or additional servers and applications may be included.

Each of the servers 106-108 are in communication with the network-based permissioning system 104 and the search system 30 over a network 112 (e.g. the Internet or an intranet). Each of the servers 106-108 are further shown to be in communication with a database server 114 that facilitates access to a resource database 116 over the network 112, though in other embodiments, the servers 106-108 may access the resource database 116 directly, without the need for a database server 114. The resource database 116 stores data resources that may be used by any one of the applications 109-111 hosted by the data processing platform 102.

The search system 30 may be used in the context of FIG. 4 to search any aspect of data resources held on the FIG. 4 network. A "data resource" as used herein may include any item of data or code (e.g., a data object) associated with the data processing platform that can be used by one or more computer programs. In example embodiments, data resources are stored in one or more network databases and are capable of being accessed by applications hosted by servers that share common access to the network database. A data resource may for example be a data analysis application, a data transformation application, a report generating application, a machine learning process, a spreadsheet or a database, or part of a spreadsheet or part of a database, e.g. records.

Therefore, users of the FIG. 4 network may perform exact and fuzzy searches between any two dictionaries representing data resources. The example of searching against a sanctions list is already given as an example, and the results of the searching may be automatically passed onto the network based permissioning system 104 automatically to allow or deny subsequent access. The search system 30 need not be limited to administrators, however, and may be used to allow other users to locate files, users, and other data entities in a less processing intensive way. Fuzzy matching may be useful in this context where people's names are difficult to spell, or where people may use nicknames. Another example is the searching of DNA/genetic/protein sequences, which may be represented by very long strings of characters and, hence, in the fields of forensic science and/or medicine (e.g. for finding compatible organ donors) the process of comparing one or more such sequences against a library of stored sequences can be made more processing efficient. The longer the strings to be searched against, the more the likelihood of error in entry of the comparison strings, and also the more processing intensive it is to compare them. A further example is the matching of entered vehicle registration numbers against a dictionary of vehicle registration numbers. For example, the dictionary may represent all vehicle registrations permitted to enter a given zone or park in a particular area. An automatic scanning system, e.g. using a video camera, may use optical character recognition (OCR) techniques to estimate one or more vehicle registrations, or may rely on an attendant manually entering them into a terminal. Both methods are prone to errors, and hence fuzzy matching may be needed to identify exact and near matches. For example, an attendant may scan or manually enter registration numbers into a handheld terminal when offline. When the attendant returns to their station, and goes online, they may upload the list of input entries to the search system 30 for comparing with a database of authorised vehicle registrations in a bulk manner.

As shown, the network system 100 also includes a client device 118 in communication with the data processing platform 102 and the network-based permissioning system 104 over the network 106. The client device 118 communicates and exchanges data with the data processing platform 102. The client device 118 may display the user interface 44 of the search system 30 shown in FIG. 3.

The client device 118 may be any of a variety of types of devices that include at least a display, a processor, and communication capabilities that provide access to the network 106 (e.g., a smart phone, a tablet computer, a personal digital assistant (PDA), a personal navigation device (PND), a handheld computer, a desktop computer, a laptop or netbook, or a wearable computing device), and may be operated by a user (e.g., a person) to exchange data with other components of the network system 100 that pertains to various functions and aspects associated with the network system 100 and its users. The data exchanged between the client device 118 and the data processing platform 102 involve user-selected functions available through one or more user interfaces (UIs). The UIs may be specifically associated with a web client (e.g., a browser) or an application 109-111 executing on the client device 118 that is in communication with the data processing platform 102. For example, the network-based permissioning system 104 provides user interfaces to a user of the client device 118 (e.g., by communicating a set of computer-readable instructions to the client device 118 that cause the client device 118 to display the user interfaces) that allow the user to register policies associated with data resources stored in the resource database 116.

Figure 5:
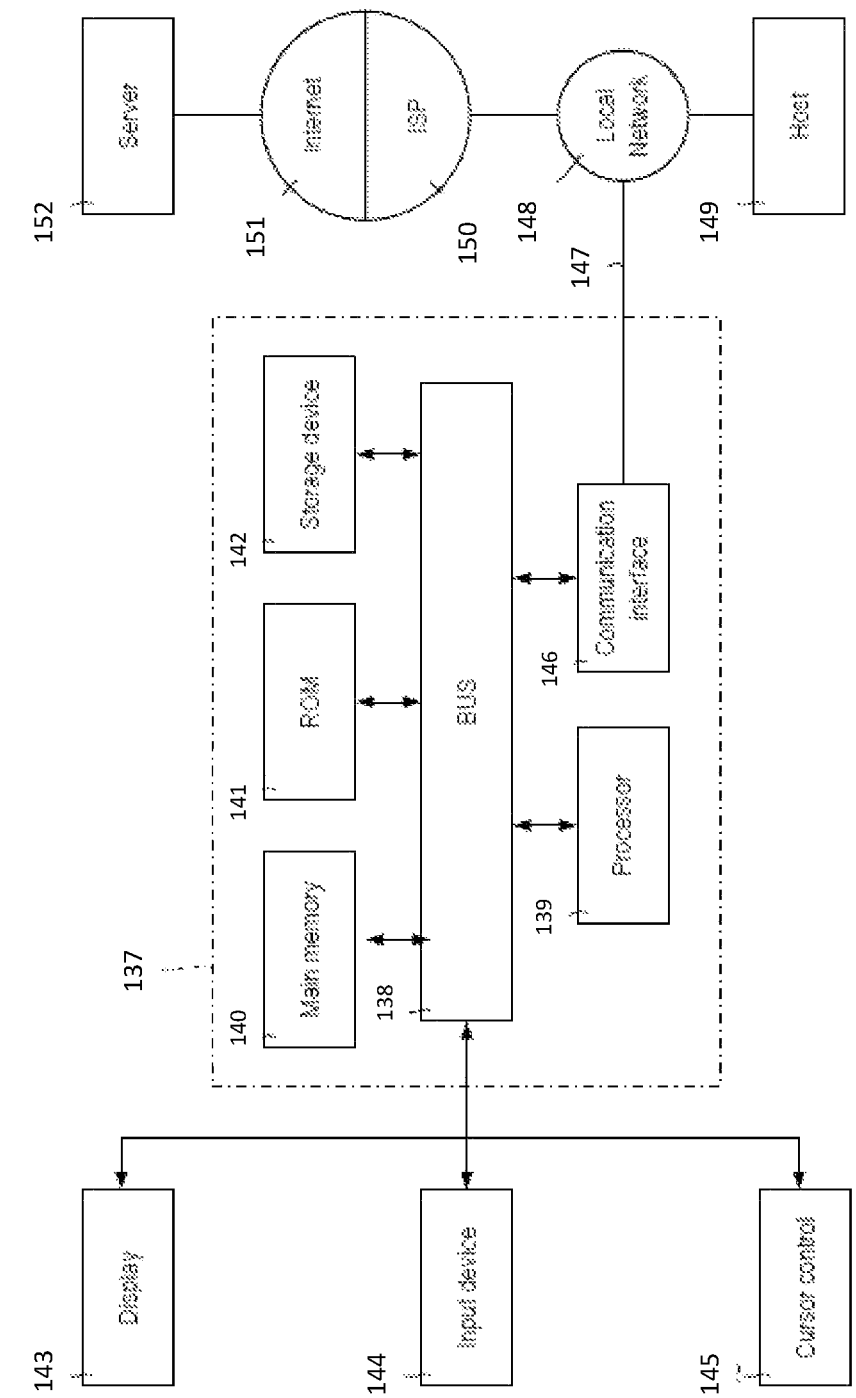
FIG. 5 is a block diagram of a computer system according to embodiments of this specification.

Referring to FIG. 5, a block diagram of an exemplary computer system 137, which may comprise one or more of the search system 30, the data processing platform 102, one or more of the servers 106-108, the database server 114 and/or the network-based permissioning system 104, consistent with examples of the present specification is shown.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine or one or more processors to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media.

The computer system 137 can send messages and receive data, including program code, through the network(s), network link 147 and communication interface 146. For example, a first application server 106 may transmit data through the local network 148 to a different application server 107, 108.

Figure 6:
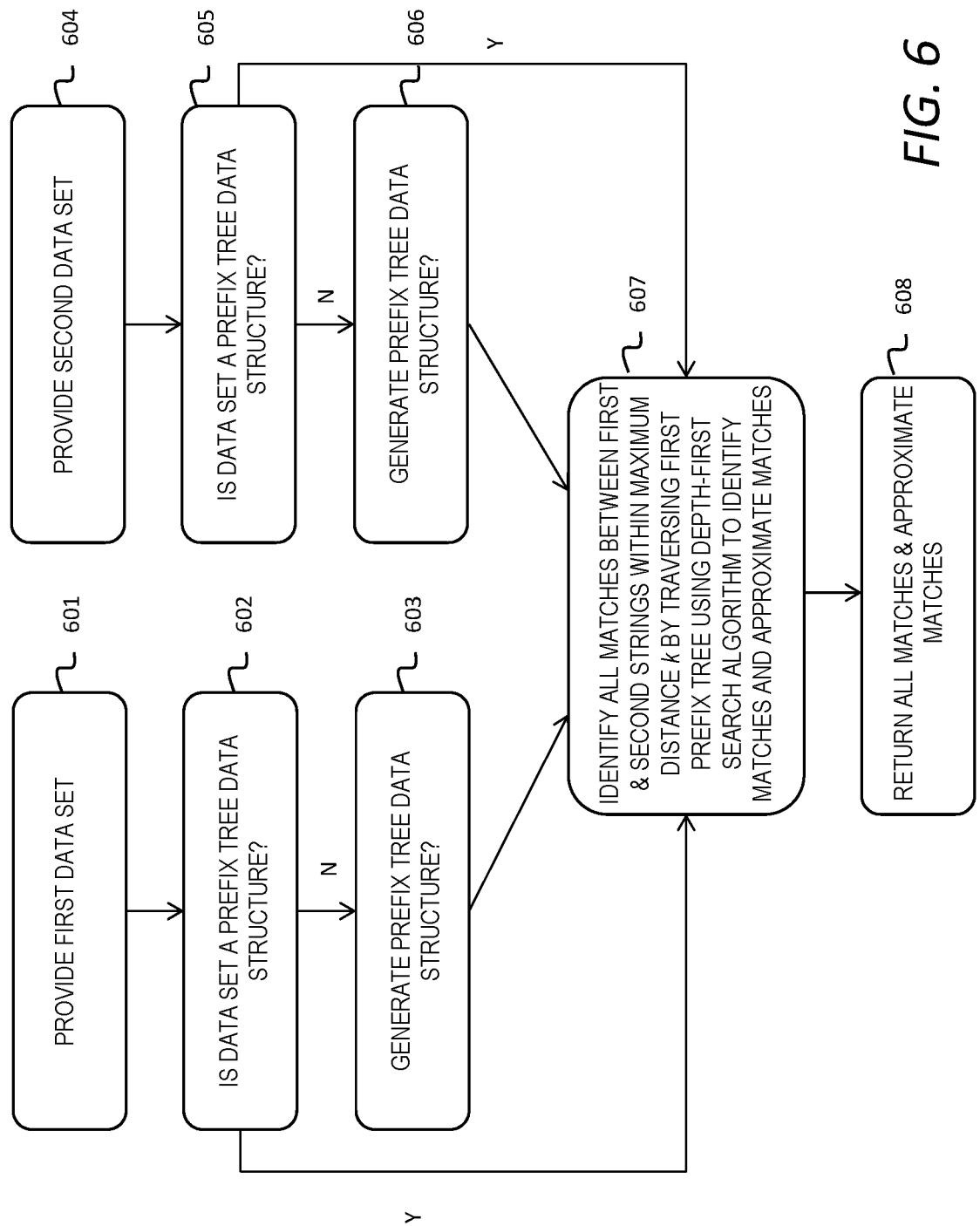
FIG. 6 is a flow diagram indicating processing operations performed by the FIG. 3 search system in accordance with example embodiments.

FIG. 6 is a flow diagram showing processing operations that may be performed by the search system 30. The operations may be performed using executable software, hardware or a combination thereof. The order of the operations may not necessarily be indicative of a required order of handling. One or more operations may be removed, substituted or enhanced.

A first operation 601 may comprise providing a first data set, or first dictionary, of terms to be searched.

A second operation 602 may comprise determining if the data set is in a suitable format, e.g. is it in a prefix tree data structure? If not, a third operation 603 of generating a prefix tree data structure from the provided first data set is performed. If it is, then a subsequent, seventh operation 607 is moved to.

A fourth operation 604 may comprise providing a second data set, or second dictionary of terms to search against the first dictionary.

A fifth operation 605 may comprise determining if the data set is in a suitable format, e.g. is it in a prefix tree data structure? If not, a sixth operation 606 of generating a prefix tree data structure from the provided second data set is performed. If it is, then the subsequent, seventh operation 607 is moved to.

The seventh operation 607 may comprise identifying all matches between first and second strings of the first and second data sets within a maximum distance k, by traversing the first prefix tree using a depth-first search algorithm to identify matches and approximate matches.

An eighth operation 608 may comprise returning all matches, exact and approximate.

Figure 7:
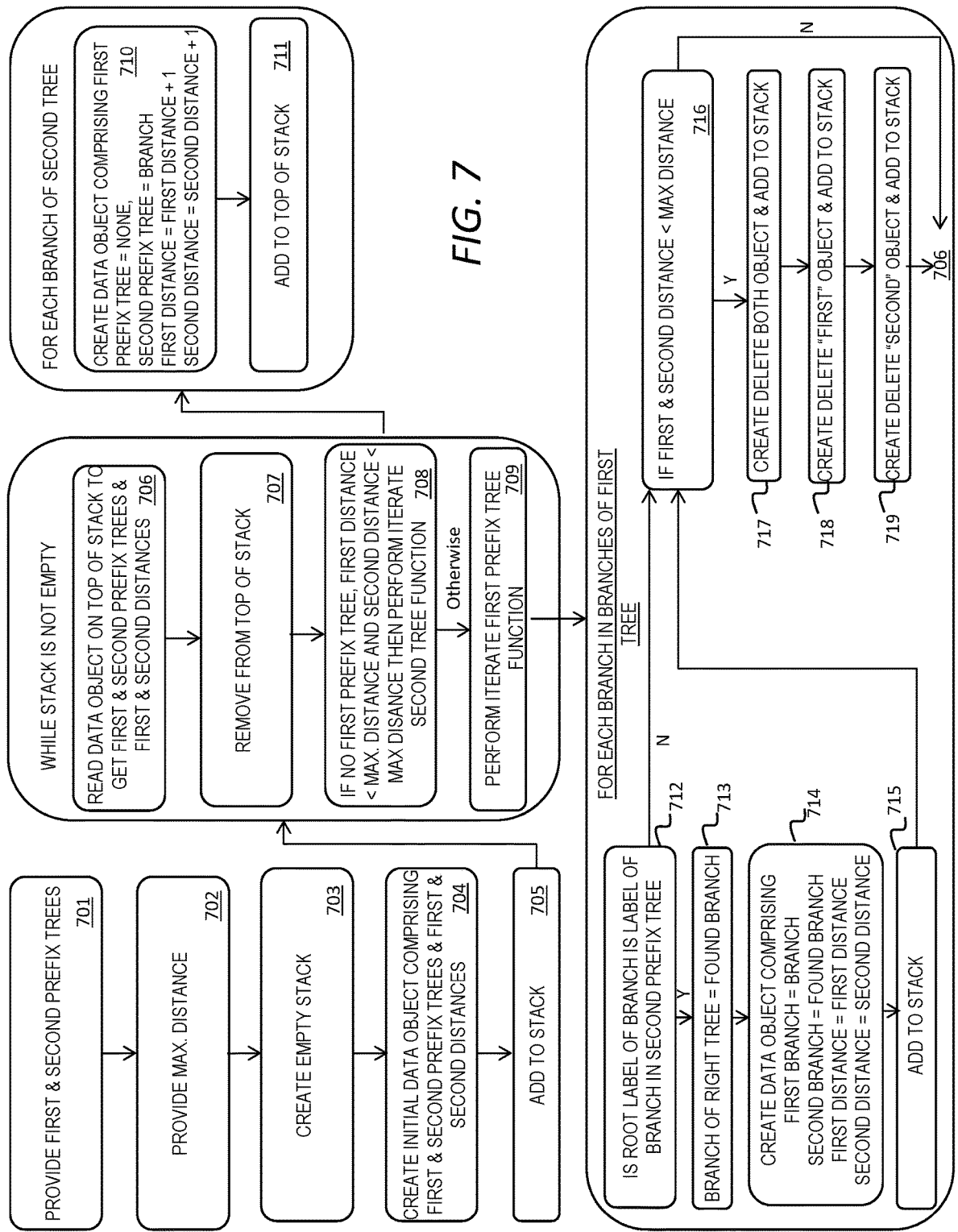
FIG. 7 is a further flow diagram indicating, in further detail, processing operations performed by the FIG. 3 search system in accordance with example embodiments.

FIG. 7 is an example of a more detailed flow diagram showing processing operations that may be performed by the search system 30. The operations may be performed in software, hardware or a combination thereof. The order of the operations may not necessarily be indicative of a required order of handling. One or more operations may be removed, substituted or enhanced.

The FIG. 7 flow diagram gives examples of further details on the algorithm that may be employed to perform the depth-first search.

First and second operations may comprise, respectively, providing first and second prefix trees 701, and providing the maximum distance 702.

The subsequent operation 703 may comprise creating an empty stack in computer memory.

The subsequent operation 704 may comprise creating an initial data object comprising the first prefix tree (first dictionary), the second prefix tree (second dictionary), a first distance and a second distance. The first distance refers to a distance associated with the first prefix tree and the second distance refers to a distance associated with the second prefix tree. Both may be set to zero at this stage.

The subsequent operation 705 may comprise adding this data object to the stack.

The process then moves to a set of operations 708-709 that are performed so long as the stack is not empty. When the stack is empty, the output of matches and approximate matches, i.e. the result(s), can be returned, although, as already mentioned, the output can be provided progressively during progress of the MPAS algorithm. These operations are as follows.

In an operation 706, the data object on top of the stack is read to get the first and second prefix trees, and the first and second distances.

In a subsequent operation 707, this data object is removed from the stack.

In a subsequent operation 708, if there is no first prefix tree (which can occur later on), and both the first and second distances do not exceed the maximum distance, then a further process, called "iterate second tree function" is performed. Otherwise, in a subsequent operation 709, a different further process, called "iterate first tree function" is performed.

The iterate second tree function will now be described, and comprises a set of operations 710, 711. The iterate second tree function is performed for each branch of the branches of the second tree in a depth-first manner.

In an operation 710, a data object is created comprising no first prefix tree (first prefix tree=0), a second prefix tree comprising the current branch (second prefix tree=branch) and both the first and second distances are incremented.

In an operation 711, this data object is added to the top of the stack 711.

The iterate first tree function will now be described, and comprises a set of operations 71-719. The iterate first tree function is performed for each branch in the branches of the first prefix tree.

In an operation 712 it is determined if there is a match between a current root label (character) of the first prefix tree and a current root label (character) in the second prefix tree.

If not, a subsequent operation 716 is moved to directly.

If there is a match, then in an operation 713 the branch of the second prefix tree is set as a found branch (branch of right tree=found branch).

Then, in an operation 714, a new data object is created, wherein the first branch is the branch, the second branch is the found branch, and the first and second distances remain unchanged.

In an operation 715, this object is added to the stack.

In the operation 716, it is determined if the first and second distances do not exceed the maximum distance.

In operations subsequent to operation 716, three different permutations are created, involving creation of a "delete both" object (operation 717), which is added to the stack, a "delete first" object (operation 718), which is then added to the stack, and a "delete second" object (operation 719) which is then added to the stack. These three operations (717, 718, 719) may be created and stacked in any order.

The different permutations created in operations 717, 718, 719 are then applied back to operation 706.

In the "delete both" operation (operation 717) the data object created comprises the branch of the first prefix tree and the branch of the second prefix tree, that is disregarding the current non-matching nodes of both trees. Both distances are incremented.

In the "delete first" operation (operation 718) the data object created comprises the branch of the first prefix tree, including the current non-matching node and the branch of the second prefix tree, disregarding the current non-matching node. The first distance is incremented and the second distance remains the same.

In the "delete second" operation (operation 719) the data object created comprises the branch of the first prefix tree, disregarding the current non-matching node and the branch of the second prefix tree, including the current non-matching node. The first distance is incremented and the second distance remains the same.

Figure 8U:
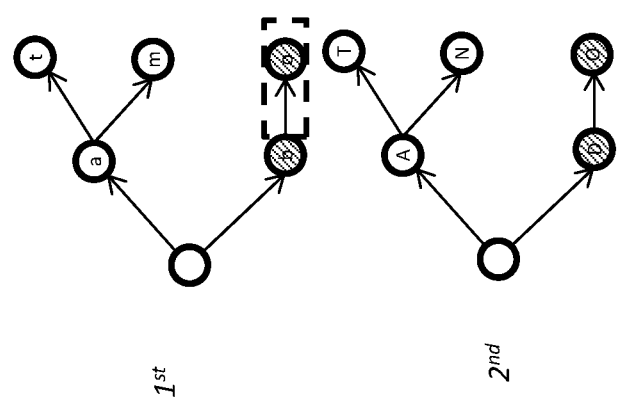

FIGS. 8A-U are a representational view of an example walk-through process of the FIGS. 6 and 7 algorithms using two example prefix trees, the top one being termed the first ($1^{st}$) prefix tree representing a first dictionary and the bottom one benign termed the second ($2^{nd}$) prefix tree representing a second dictionary. The first dictionary comprises the words {at, am, bo} and the second dictionary comprises the words {AT, AN, DO}. The use of capitals for the second dictionary is merely to assist differentiation, and for the purposes of this example, a=A and so on. Also, rather than keeping track of both first and second distance, we will merely refer to the single, largest distance. We will also assume a maximum distance k=1, meaning that we can expect, by observation, the following results: at =AT; at =AN; am=AN; am=AT; bo=DO.

In FIG. 8A, the nodes for "a" and "A" are compared and a match found. The distance remains zero.

In FIG. 8B, the nodes are traversed in depth-first order and the nodes for "a" "t" are compared with "A" "T" to find a match for at =AT. The distance remains zero. There are no more branches, so at =AT can be returned or saved for output later.

In FIG. 8C, the nodes for "a" "t" are compared with the nodes for "A" "N" and no match is found, so the distance is one. There are no more branches, so at =AN can be returned or saved for output later.

In FIG. 8D, the nodes for "a" "m" are compared with the nodes for "A" "T" and no match is found. The distance is one. There are no more branches, so am=AT can be returned or saved for output later.

In FIG. 8E, the nodes for "a" "m" are compared with the nodes for "A" "N" and no match is found. The distance is one. There are no more branches, so am=AN can be returned or saved for output later.

In FIG. 8F, the node for "a" is compared with the node for "D" in accordance with depth-first order, and no match is found. The distance is one. Because there are other branches, we find permutations for delete both, delete first and delete second.

In FIG. 8G, a delete both permutation disregards the "a" node and the "D" node, for comparing the "t" node with the "O" node. This permutation itself increments distances to one, and the lack of match makes it two, causing k to be exceeded. There is no fuzzy match for this permutation. In FIG. 8H, the same process repeats for comparing the "m" node with the "O" node. Again, there is no match and k is exceeded. There is no fuzzy match for this permutation.

In FIG. 8I, a delete second permutation disregards the "D" node only and therefore "t" is compared with "O" and no match is found, causing k to be exceeded. There is no fuzzy match for this permutation.

In FIG. 8J, a delete first permutation disregards the "a" node only and therefore "t" is compared with the node for "D" and no match is found, causing k to be exceeded. There is no fuzzy match for this permutation. In FIG. 8K, the same process repeats for comparing "m" with the node for "D" and no match is found, causing k to be exceeded. There is no fuzzy match for this permutation.

In FIGS. 8L-8Q, the same process repeats but because the next first-level node "b" is compared as before, there is no chance of fuzzy matching until the situation at FIGS. 8R and 8S.

Referring to FIG. 8R, the "b" node is compared with the "D" node and no match is found. However, because the distance is 1, and this is still below k, and because there is a branch, in FIG. 8S, a comparison resulting from the delete both permutation matches the "o" node with the "O" node, meaning that a match is identified for bo=DO. This demonstrates how the algorithm allows skipping over of one (or more nodes) if the value of k allows.

Referring to FIG. 8T, the "b" node is compared with the "O" node and so there is no match. Referring to FIG. 8U, the "o" node is compared with the "D" node and so there is no match. The process then ends and the results can be output as at =AT; at =AN; am=AN; am=AT; bo=DO.

According to one example, there is disclosed a method, performed by one or more processors, the method comprising: providing a first prefix tree data structure representing a first data set comprising a first plurality of strings; providing a second prefix tree data structure representing a second data set comprising a second plurality of strings, wherein the first and second prefix tree data structures each comprise nodes representing each character and edges connecting prefix nodes to one or more suffix nodes to represent each subsequent character in the string; performing a search to identify all matches between the first and second plurality of strings and also approximate matches between the first and second plurality of strings within a maximum distance k, wherein the search comprises traversing the first prefix tree data structure using a depth-first search algorithm to identify matches and approximate matches in the second prefix tree data structure; and returning as output all matches and approximate matches.

In some examples, the method may further comprise traversing the second prefix tree data structure using the depth-first search algorithm to identify all matches and approximate matches in the first prefix tree data structure at the corresponding node depth; and returning as further output all matches and approximate matches.

In certain examples, the depth-first search algorithm may be configured such that each prefix node is evaluated only once prior to traversing to another prefix node at the same level in the same tree structure. The maximum distance k may be any positive integer and wherein, whilst a current distance does not exceed said maximum distance k, the depth-first search algorithm may jump over non-matching nodes to dependent nodes.

In some examples, the depth-first search algorithm may comprise: comparing first and second nodes having the same depth level in the first and second prefix trees to identify a match; in the event of a match, traversing to respective descendent nodes of the first and second nodes in a depth-first order and repeating the comparison until there is no match or there are no further descendent nodes; in the event of no match at the same depth level: incrementing or changing a dynamic distance measure; and, while a current distance measure does not exceed or go beyond the maximum distance k, comparing possible combinations of descendent nodes of the non-matching prefix node of one of the prefix trees with possible combinations of descendent nodes of the other non-matching prefix node of the other prefix tree; and identifying an approximate match if there are no further descendent nodes.

In some examples, in the event of no match at the same depth level, and, while the current distance measure does not exceed the maximum distance k, the method may further comprise: comparing also each non-matching prefix node with possible combinations of descendent nodes of the other non-matching prefix node; and identifying an approximate match if there are no further descendent nodes. The comparing may follow a predetermined depth-first traversal algorithm having a predetermined traversal order for performing the comparisons.

In certain examples, the distance measure may be a Levenshtein distance (LD), being the minimum number of single character changes required to change one string to the other. The predetermined maximum distance k may be user definable through a user interface.

In some examples, the method may further comprise receiving a first plurality of strings and generating therefrom the first prefix tree data structure, and receiving a second plurality of strings and generating therefrom the second prefix tree structure.

In certain examples, the method may further comprise storing the first and second prefix tree data structures in respective data containers for subsequent sending to a plurality of processors or controller for performance of the depth-first search algorithm using parallel processing.

In some examples, the first plurality of strings may comprise a sanctions list of entities not permitted to access, or perform one or more operations at, one or more technical systems, and wherein the second plurality of strings comprises a list of entities requesting access or performance of the operations at the one or more technical systems. The sanctions list may comprise a list of network addresses, e.g. IP address, which are blocked from accessing a computer system, and wherein the second plurality of strings comprises a list of IP addresses requesting access to the computer system.

In certain examples, the first plurality of strings may comprise a reference list of genetic sequences held on a database, or indeed any biological or chemical sequences, and wherein the second plurality of strings comprises a list of genetic or other sequences to be compared with the reference list.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another or may be combined in various ways. All possible combinations and sub combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the disclosure. It will be appreciated, however, that no matter how detailed the foregoing appears in text, the disclosure can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the disclosure with which that terminology is associated. The scope of the disclosure should therefore be construed in accordance with the appended claims and any equivalents thereof.

What is claimed is:

1. A method, performed by one or more processors, the method comprising:
   providing a first prefix tree data structure representing a first data set comprising a first plurality of strings;
   providing a second prefix tree data structure representing a second data set comprising a second plurality of strings,
   wherein the first and second prefix tree data structures each comprise nodes representing each character and edges connecting prefix nodes to one or more suffix nodes to represent each subsequent character in the string;
   performing a search to identify all matches between the first and second plurality of strings and also approximate matches between the first and second plurality of strings within a maximum distance k, wherein the search comprises traversing the first prefix tree data structure using a depth-first search algorithm to identify matches and approximate matches in the second prefix tree data structure; and
   returning as output all matches and approximate matches, wherein the depth-first search algorithm comprises:
      comparing first and second nodes having the same depth level in the first and second prefix trees to identify a match;
      in the event of a match, traversing to respective descendent nodes of the first and second nodes in a depth-first order and repeating the comparison until there is no match or there are no further descendent nodes;
      in the event of no match at the same depth level:
         incrementing a dynamic distance measure; and,
         while a current distance measure does not exceed the maximum distance k, comparing possible combinations of descendent nodes of the non-matching prefix node of one of the prefix trees with possible combinations of descendent nodes of the other non-matching prefix node of the other prefix tree;
         comparing each non-matching prefix node with possible combinations of descendent nodes of the other non-matching prefix node; and
         identifying an approximate match if there are no further descendent nodes.

2. The method of claim 1, further comprising traversing the second prefix tree data structure using the depth-first search algorithm to identify all matches and approximate matches in the first prefix tree data structure at the corresponding node depth; and returning as further output all matches and approximate matches.

3. The method of claim 1, wherein the depth-first search algorithm is configured such that each prefix node is evaluated only once prior to traversing to another prefix node at the same level in the same tree structure.

4. The method of claim 1, wherein the maximum distance k is any positive integer and wherein, whilst a current distance does not exceed said maximum distance k, the depth-first search algorithm may jump over non-matching nodes to dependent nodes.

5. The method of claim 1, wherein the comparing follows a predetermined depth-first traversal algorithm having a predetermined traversal order for performing the comparisons.

6. The method of claim 1, wherein the maximum distance k is a Levenshtein distance (LD), being the minimum number of single character changes required to change one string to the other.

7. The method of claim 1, wherein the maximum distance k is user definable through a user interface.

8. The method of claim 1, further comprising receiving a first plurality of strings and generating therefrom the first prefix tree data structure, and receiving a second plurality of strings and generating therefrom the second prefix tree structure.

9. The method of claim 8, further comprising storing the first and second prefix tree data structures in respective data containers for subsequent sending to a plurality of processors or controller for performance of the depth-first search algorithm using parallel processing.

10. The method of claim 1, wherein the first plurality of strings comprises a sanctions list of entities not permitted to access, or perform one or more operations at, one or more technical systems, and wherein the second plurality of strings comprises a list of entities requesting access or performance of the operations at the one or more technical systems.

11. The method of claim 10, wherein the sanctions list comprises a list of network addresses, e.g. IP address, which are blocked from accessing a computer system, and wherein the second plurality of strings comprises a list of IP addresses requesting access to the computer system.

12. The method of claim 1, wherein the first plurality of strings comprises a reference list of genetic sequences held on a database, and wherein the second plurality of strings comprises a list of genetic sequences to be compared with the reference list.

13. A non-transitory computer readable medium comprising executable instruction stored therein that when executed by one or more processors of a data processing apparatus, causes the data processing apparatus to perform:
  providing a first prefix tree data structure representing a first data set comprising a first plurality of strings;
  providing a second prefix tree data structure representing a second data set comprising a second plurality of strings,
  wherein the first and second prefix tree data structures each comprise nodes representing each character and edges connecting prefix nodes to one or more suffix nodes to represent each subsequent character in the string;
  performing a search to identify all matches between the first and second plurality of strings and also approximate matches between the first and second plurality of strings within a maximum distance k, wherein the search comprises traversing the first prefix tree data structure using a depth-first search algorithm to identify matches and approximate matches in the second prefix tree data structure; and
  returning as output all matches and approximate matches, wherein the depth-first search algorithm comprises:
    comparing first and second nodes having the same depth level in the first and second prefix trees to identify a match;
    in the event of a match, traversing to respective descendent nodes of the first and second nodes in a depth-first order and repeating the comparison until there is no match or there are no further descendent nodes;
    in the event of no match at the same depth level:
      incrementing a dynamic distance measure; and,
      while a current distance measure does not exceed the maximum distance k, comparing possible combinations of descendent nodes of the non-matching prefix node of one of the prefix trees with possible combinations of descendent nodes of the other non-matching prefix node of the other prefix tree;
      comparing each non-matching prefix node with possible combinations of descendent nodes of the other non-matching prefix node; and
    identifying an approximate match if there are no further descendent nodes.

14. An apparatus comprising:
one or more processors; and
a memory storing instructions, the instructions, when executed by the one or more processors, causing the apparatus to perform:
  providing a first prefix tree data structure representing a first data set comprising a first plurality of strings;
  providing a second prefix tree data structure representing a second data set comprising a second plurality of strings,
  wherein the first and second prefix tree data structures each comprise nodes representing each character and edges connecting prefix nodes to one or more suffix nodes to represent each subsequent character in the string;
  performing a search to identify all matches between the first and second plurality of strings and also approximate matches between the first and second plurality of strings within a maximum distance k, wherein the search comprises traversing the first prefix tree data structure using a depth-first search algorithm to identify matches and approximate matches in the second prefix tree data structure; and
returning as output all matches and approximate matches, wherein the depth-first search algorithm comprises:
  comparing first and second nodes having the same depth level in the first and second prefix trees to identify a match;
  in the event of a match, traversing to respective descendent nodes of the first and second nodes in a depth-first order and repeating the comparison until there is no match or there are no further descendent nodes;
  in the event of no match at the same depth level:
    incrementing a dynamic distance measure; and,
    while a current distance measure does not exceed the maximum distance k, comparing possible combinations of descendent nodes of the non-matching prefix node of one of the prefix trees with possible combinations of descendent nodes of the other non-matching prefix node of the other prefix tree;
    comparing each non-matching prefix node with possible combinations of descendent nodes of the other non-matching prefix node; and
  identifying an approximate match if there are no further descendent nodes.

* * * * *